United States Patent [19]

Smith et al.

[11] Patent Number: 5,403,567
[45] Date of Patent: Apr. 4, 1995

[54] DUAL IMPELLER METHOD AND APPARATUS FOR EFFECTING CHEMICAL CONVERSION

[76] Inventors: James W. Smith, 33 Airdrie Road, Toronto, Ontario, Canada, M4G 1L8; Nim Y. Lee, 30 Mallon Avenue, Toronto, Ontario, Canada, M4M 1P6

[21] Appl. No.: 224,126

[22] Filed: Apr. 6, 1994

Related U.S. Application Data

[63] Continuation of Ser. No. 709,158, Jun. 13, 1991, abandoned, which is a continuation-in-part of Ser. No. 446,777, Dec. 6, 1989, abandoned.

[30] Foreign Application Priority Data

Dec. 5, 1989 [CA] Canada .................... 2004653

[51] Int. Cl.⁶ .................... C02F 1/72; C01B 17/02; C01B 17/16; C01B 31/70
[52] U.S. Cl. .................... 423/210; 210/221.1; 210/705; 210/758; 261/84; 423/224; 423/226; 423/222; 423/551; 423/576.6; 423/243.08
[58] Field of Search .............. 423/222, 224, 226, 227, 423/228, 574 L, 576.2, 576.5, 576.8, 576.6; 210/703, 704, 705, 758, 221.1, 221.2; 261/84, 85, 86, 87

[56] References Cited

U.S. PATENT DOCUMENTS

| | | | |
|---|---|---|---|
| 2,659,691 | 11/1953 | Grislon et al. | 208/207 |
| 3,170,766 | 2/1965 | Townsend | 423/574 L |
| 3,647,069 | 5/1972 | Bailey | 210/221.1 |
| 3,833,710 | 9/1974 | Deschamps | 423/574 L |
| 3,911,093 | 10/1975 | Sherif et al. | 423/574 |
| 3,983,225 | 9/1976 | Van Brocklin et al. | 423/574 L |
| 3,993,563 | 11/1976 | Desner | 261/79.2 |
| 4,009,251 | 2/1977 | Meuly | 423/573 C |
| 4,036,942 | 7/1977 | Sibeud et al. | 423/226 |
| 4,238,462 | 12/1980 | Haridison | 423/576.6 |
| 4,243,648 | 1/1981 | Fenton | 423/576.6 |
| 4,409,191 | 10/1983 | Osman | 423/228 |
| 4,525,338 | 6/1985 | Klee, Jr. et al. | 423/573 C |
| 4,534,952 | 9/1985 | Rapson et al. | 210/754 |
| 4,649,032 | 3/1987 | Snavely, Jr. et al. | 423/226 |
| 4,774,071 | 9/1988 | Jeffery et al. | 423/576.6 |
| 4,789,530 | 12/1988 | Johnson et al. | 423/228 |
| 4,808,385 | 2/1989 | Grinstend | 423/228 |
| 4,826,645 | 4/1989 | Jones et al. | 423/226 |
| 4,830,838 | 5/1989 | Kent et al. | 423/576.6 |
| 4,889,701 | 12/1989 | Jones et al. | 423/576.5 |
| 4,909,945 | 3/1990 | Delany | 423/573.1 |
| 4,919,914 | 4/1990 | Smith et al. | 423/576.2 |

FOREIGN PATENT DOCUMENTS

| | | | |
|---|---|---|---|
| 1212819 | 10/1986 | Canada | 423/576.6 |
| 86919 | 8/1983 | European Pat. Off. | |
| 3712007 | 10/1988 | Germany | |
| 1521785 | 8/1978 | United Kingdom | |

OTHER PUBLICATIONS

Chemical Abstracts vol. 81 #8, 1974 Columbus Ohio p. 242 Abstract 41073s & JPA 7385475 Tabata Kagaku Co Ltd 13 Nov. 1973.

*Primary Examiner*—Gary P. Straub

[57] ABSTRACT

Hydrogen sulfide or other gaseous component is removed from a gas stream containing the same by distribution of the gas stream in the form of fine bubbles by a rotary impeller and stationary shroud arrangement at a submerged location in an aqueous iron or other transition metal chelate solution, or other suitable catalyst, contained in an enclosed reaction vessel. Sulfur particles, or other insoluble phase product, of narrow particle size range formed in the reaction are floated off from the iron chelate solution. An oxygen-containing gas stream also is distributed in the form of fine bubbles by a separate rotary impeller and stationary shroud arrangement at a separate submerged location in the iron chelate solution. The second submerged location generally is separated from the first by a baffle extending downwardly in the reaction vessel from a top closure towards a bottom closure.

22 Claims, 2 Drawing Sheets

5,403,567

DUAL IMPELLER METHOD AND APPARATUS FOR EFFECTING CHEMICAL CONVERSION

REFERENCE TO RELATED APPLICATION

This is a continuation of application Ser. No. 709,158, filed Jun. 3, 1991, now abandoned which is a continuation-in-part of U.S. patent application Ser. No. 446,777, filed Dec. 6, 1989, now abandoned.

FIELD OF INVENTION

The present invention relates to method and apparatus for carrying out chemical reactions involving removal of gaseous components from gas streams by chemical conversion to an insoluble phase while in contact with a liquid phase.

BACKGROUND TO THE INVENTION

Many gas streams contain components which are undesirable and which need to be removed from the gas stream prior to its discharge to the atmosphere or further processing. One such component is hydrogen sulfide, while another such component is sulfur dioxide.

The combustion of sulfur-containing carbonaceous fuels, such as fuel oil, fuel gas, petroleum coke and coal, as well as other processes, produces an effluent gas stream containing sulfur dioxide. The discharge of such sulfur dioxide-containing gas streams to the atmosphere has lead to the incidence of the phenomenon of "acid rain", which is harmful to a variety of vegetation and other life forms. Various proposals have been made to decrease such emissions.

Hydrogen sulfide occurs in varying quantities in a variety of gas streams, for example, in sour natural gas streams and in tail gas streams from various industrial operations. Hydrogen sulfide is odiferous, highly toxic and a catalyst poison for many reactions and hence it is desirable and often necessary to remove hydrogen sulfide from such gas streams.

There exist several commercial processes for effecting hydrogen sulfide removal. These include processes such as absorption in solvents, in which the hydrogen sulfide first is removed as such and then converted into elemental sulfur in a second distinct step, such as a Claus plant. Such commercial processes also include liquid phase oxidation processes, such as Stretford, LO-CAT, Unisulf, Sulferox, Hiperion and others, whereby the hydrogen sulfide removal and conversion to elemental sulfur normally are effected in reaction and regeneration steps.

In Canadian Patent No. 1,212,819 and its corresponding U.S. Pat. No. 4,919,914, the disclosure of which is incorporated herein by reference, there is described a process for the removal of hydrogen sulfide from gas streams by oxidation of the hydrogen sulfide at a submerged location in an agitated flotation cell in intimate contact with an iron chelate solution and flotation of sulfur particles produced in the oxidation from the iron chelate solution by hydrogen sulfide-depleted gas bubbles. In this prior art operation, both an oxygen-containing gas stream and a hydrogen sulfide-containing gas stream are distributed as fine gaseous bubbles at the same submerged location in the iron chelate solution to effect oxidation of the hydrogen sulfide.

In practice, it has been found that the quantity of oxygen required to be provided to effect substantially complete oxidation of the hydrogen sulfide to sulfur significantly exceeds the stoichiometric quantity theoretically required and experimentation has been unable to decrease the oxygen requirement below about five times stoichiometric. In other prior art hydrogen sulfide-removal processes, generally more than twenty times the stoichiometric quantity of oxygen is required.

SUMMARY OF INVENTION

In accordance with the present invention, there is provided a novel procedure for carrying out the hydrogen sulfide removal process outlined above whereby the oxygen usage is significantly improved, as well as novel equipment for carrying out such procedure.

The present invention is particularly concerned with the removal of hydrogen sulfide from a gas stream containing the same by a novel procedure and to novel equipment for effecting the same. However, the principles of the present invention are generally applicable to the removal of gas, liquid and/or solid components from a gas stream by chemical reaction. In the present invention, an efficient contact of gas and liquid is carried out for the purpose of effecting a reaction which removes a component of the gas and converts that component to an insoluble phase while in contact with the liquid phase.

There are a variety of processes to which the principles of the present invention can be applied. The processes generally involve reaction of the component with another gaseous species in a liquid phase, usually an aqueous phase, often an aqueous catalyst system.

One example of such a process is the oxidative removal of hydrogen sulfide from gas streams in contact with an aqueous transition metal chelate system to form sulfur particles, as described generally in the above-mentioned Canadian Patent No. 1,212,819.

Another example of such a process is in the oxidative removal of mercaptans from gas streams in contact with a suitable aqueous catalyst system to form immiscible liquid disulfides.

A further example of such a process is the oxidative removal of hydrogen sulfide from gas streams using chlorine in contact with an aqueous sodium hydroxide solution, to form sodium sulphate, which, after first saturating the solution, precipitates from the aqueous solution.

An additional example of such a process is the removal of sulfur dioxide from gas streams by the so-called "Wackenroder's" reaction by contacting hydrogen sulfide with an aqueous phase in which the sulfur dioxide is initially absorbed, to form sulfur particles. This process is described in U.S. Pat. Nos. 3,911,093 and 4,442,083. The procedure of the present invention also may be employed to effect the removal of sulfur dioxide from a gas stream into an absorbing medium in an additional gas-liquid contact vessel.

A further example of such a process is the removal of sulfur dioxide from gas streams by reaction with an aqueous alkaline material.

The term "insoluble phase" as used herein, therefore, encompasses a solid insoluble phase, an immiscible liquid phase and a component which becomes insoluble when reaching its solubility limit in the liquid medium after start up.

In one aspect of the present invention, there is provided a method for the removal of a gaseous component from a gas stream containing the same by chemical conversion of the gaseous component to an insoluble phase in a liquid phase, comprising a plurality of steps.

In this method, an enclosed reaction zone is provided having a liquid medium. The gaseous component-containing gas stream is fed to a first submerged location in the liquid medium and is distributed at the first submerged location in the form of small gas bubbles. A second gas stream, different from the gaseous component-containing stream, is fed to a second submerged location in the liquid medium spaced apart from the first submerged location therein and is distributed at the second submerged location in the form of small gas bubbles.

Interaction is permitted between the small gas bubbles of the gaseous component-containing gas stream, the small gas bubbles of the second gas stream and the liquid medium to effect conversion of the gaseous component to the insoluble phase in the liquid medium.

The reaction zone preferably is provided with divider means therein extending from a top closure to the reaction zone downwardly into the liquid medium to establish first and second individual reaction zones separated physically one from another by the divider means but in liquid flow communication with each other.

In the embodiment employing the divider means, the first submerged location is located in the first individual reaction zone and the second submerged location is located in the second individual reaction zone.

Any desired gas-liquid contact means may be employed at each of the submerged locations in order to effect distribution of the gas stream as small gas bubbles at the respective submerged location. Preferably, the gas-liquid contact means at each submerged location comprises a shroud and impeller combination as described in more detail below.

The insoluble phase formed in the liquid medium often is provided in a form which is flotable by the gas bubbles after the interaction. In a preferred embodiment, the depleted gas bubbles are permitted to rise through the liquid medium in the respective individual reaction zones and to float the insoluble phase on the surface of the liquid medium in the respective individual reaction zones. However, where appropriate, the solid phase may be filtered off.

For the removal of hydrogen sulfide from a gas stream by oxidation to sulfur, using an oxygen-containing gas stream as the second gas stream, an aqueous transition metal catalyst solution is employed as the liquid medium. By introducing the oxygen-containing gas stream at a different submerged location from the hydrogen sulfide-containing gas stream, it has been found that the quantity of oxygen required for oxidative removal of hydrogen sulfide can be considerably decreased compared to the process of Canadian Patent No. 1,212,819, to less than two times stoichiometric. In addition, by introducing the gas streams at different locations within the aqueous phase and by employing a baffle separating the reaction zones, any danger of forming an explosive gas mixture of the oxygen-containing gas stream and the hydrogen sulfide-containing gas stream is eliminated.

The present invention also includes novel apparatus for effecting gas-liquid contact reactions, including the removal of hydrogen sulfide from gas streams. In accordance with a second aspect of the invention, such apparatus includes a plurality of elements. An enclosed vessel has divider means extending downwardly within the vessel from an upper closure thereof towards a lower closure to divide the vessel into first and second separate reaction zones which are in liquid flow communication one with another via the body of liquid medium.

First gas feed pipe means extends downwardly in one of the reaction zones. First rotary impeller means is located at the lower end of the first gas pipe means and is mounted for rotation about a vertical axis. First shroud means surrounds the first rotary impeller means and has a plurality of openings therethrough.

Second gas feed pipe means extends downwardly in the other of the reaction zones. Second rotary impeller means is located at the lower end of the second gas feed pipe means and is mounted for rotation about a vertical axis. Second shroud means surrounds the second rotary impeller means and has a plurality of openings therethrough.

In the apparatus, therefore, two individual combinations of gas feed pipe, impeller and shroud are provided in separate reaction zones physically separated by a divider or baffle.

While the present invention is directed particularly to the removal of hydrogen sulfide from gas streams containing the same and will be described in particular with reference thereto, the invention is more broadly based, as described above.

GENERAL DESCRIPTION OF INVENTION

Figure 1:
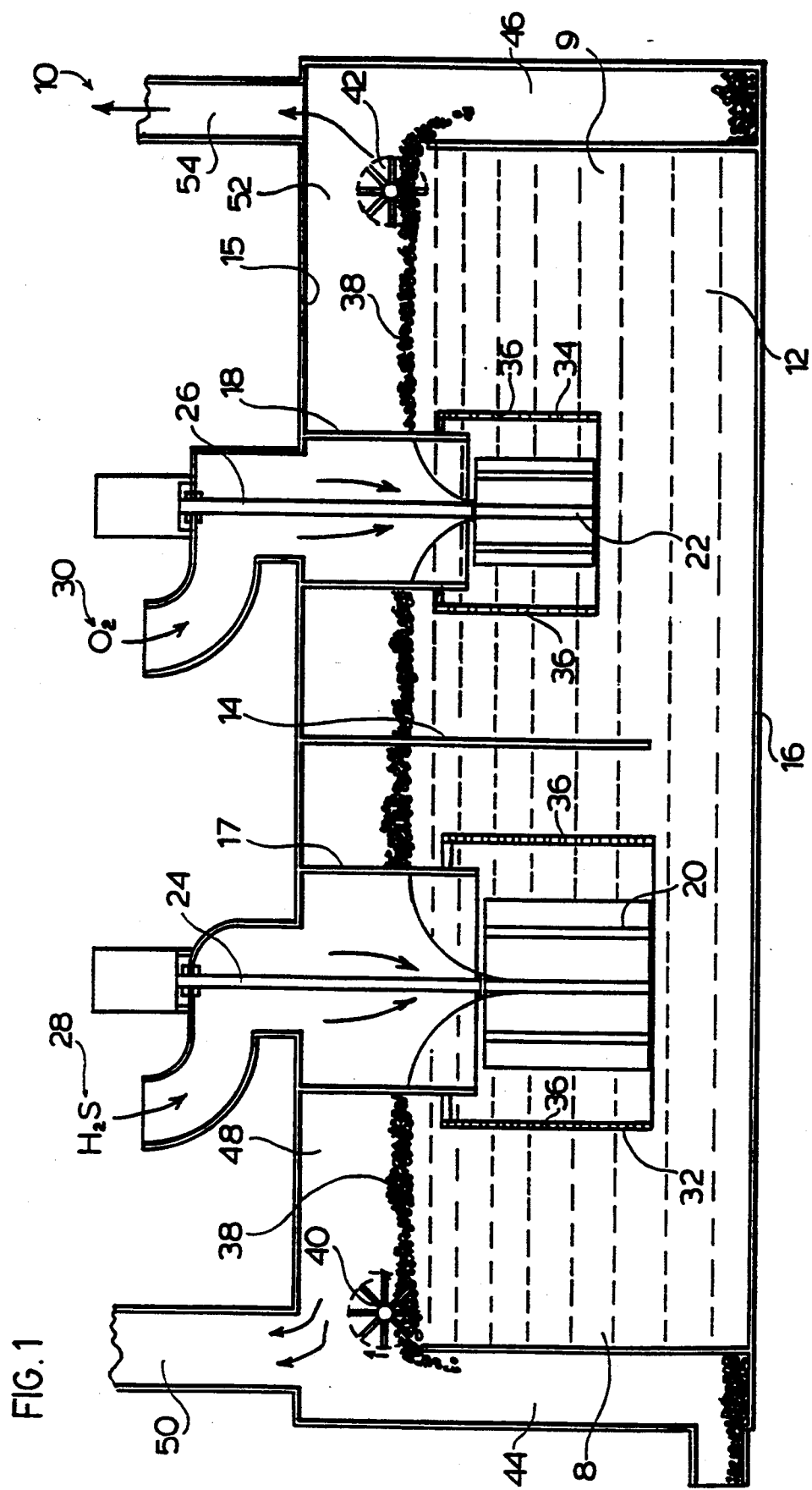
FIG. 1 is a schematic representation of an apparatus constructed in accordance with one embodiment of the invention.

One embodiment of the present invention is directed towards removing hydrogen sulfide from gas streams. High levels of hydrogen sulfide removal efficiency are attained, generally in excess of 99.99%, from gas streams containing any concentration of hydrogen sulfide. Residual concentrations of hydrogen sulfide less than 0.1 ppm by volume can be attained.

The process of the invention is able to remove effectively hydrogen sulfide from a variety of different source gas streams containing the same, provided there is sufficient oxygen to oxidize the hydrogen sulfide. The oxygen may be present in the hydrogen sulfide-containing gas stream to be treated or may be separately fed, as is desirable where natural gas or other combustible gas streams are treated.

The process of the present invention is able to remove effectively hydrogen sulfide from a variety of different source gas streams containing the same, provided there is sufficient oxygen to oxidize the hydrogen sulfide. Such gas streams include fuel gas and natural gas and other hydrogen sulfide-containing streams, such as those formed in oil processing, in oil refineries, mineral wool plants, kraft pulp mills, rayon manufacturing, heavy oil and tar sands processing, coking coal processing, meat rendering, a foul gas stream produced in the manufacture of carborundum, and gas streams formed by air stripping hydrogen sulfide from aqueous phases. The gas stream may be one containing solid particulates or may be one from which such particulates are absent. The ability to handle a particulate-laden gas stream without plugging may be beneficial, since the necessity for upstream cleaning of the gas is obviated.

The process of the present invention for effecting removal of hydrogen sulfide from a gas stream containing the same employs a transition metal chelate in aqueous medium as the catalyst for the oxidation of hydrogen sulfide to sulfur. The transition metal usually is iron, although other transition metals, such as vanadium, chromium, manganese, nickel and cobalt may be employed. Any desired chelating agent may be used but generally, the chelating agent is ethylenediaminetetraacetic acid (EDTA). An alternative chelating agent is HEDTA. The transition metal chelate catalyst may be employed in hydrogen or salt form. The operative range of pH for the process generally is about 7 to about 11.

The hydrogen sulfide removal process is conveniently carried out at ambient temperatures of about 20° to 25° C., although higher and lower temperatures may be utilized and still achieve an efficient operation. The temperature is generally ranges from about 5° to about 80° C.

The minimum catalyst concentration to hydrogen sulfide concentration ratio for a given gas throughput may be determined from the rates of the various reactions occurring in the process and is influenced by the temperature and the degree of agitation or turbulence in the reaction vessel. This minimum value may be determined for a given set of operating conditions by decreasing the catalyst concentration until the removal efficiency with respect to hydrogen sulfide begins to drop sharply. Any concentration of catalyst above this minimum may be used, up to the catalyst loading limit of the system.

The process of the present invention generally is effected in a unique apparatus, which constitutes one aspect of the present invention. The apparatus comprises an enclosed vessel containing a body of the chelated iron catalyst solution and the catalyst solution preferably is divided into two zones by an internal divider or baffle extending downwardly from an upper closure to the vessel into the catalyst solution to a portion of the depth thereof. The purpose of the divider or baffle, when present, is to prevent mixing of the gases in the gas spaces above the respective reaction zones in the catalyst solution, and to provide two reaction zones in the catalyst solution which are physically separate from each other.

The baffle extends only part-way downwardly within the body of catalyst solution, so that there is common body of catalyst solution below the lower edge of the baffle. The baffle may be constructed of any convenient material of construction which achieves this result. The baffle may be constructed of a solid material, or, alternatively, in the portion immersed in the liquid phase, the baffle may be in the form of a fine mesh material which permits liquid flow therethrough but which inhibits the flow of the small gas bubbles therethrough. The mesh may be rendered water-wettable to cause the gas to coalesce.

By providing separate reaction zones within the body of catalyst solution, mixing of the gas streams is largely prevented. Although some flow of hydrogen sulfide-containing gas to the reaction zone into which the oxygen-containing gas stream is fed can be tolerated, it is highly undesirable for the oxygen-containing gas stream to flow to the reaction zone into which the hydrogen sulfide-containing stream is fed, since this flow may lead to contamination of the product gas stream from the hydrogen sulfide removal process, which would be highly undesirable with certain gas streams, for example, natural gas streams. Another advantage is that, if further treatment of that gas stream is required, a lesser volume results than if the gases are mixed.

Although the invention is described particularly with respect to the provision of two separate reaction zones within the body of catalyst solution, it will be readily apparent to those skilled in the art that more than two reaction zones may be employed, as desired, by employing additional baffles downwardly-extending into the catalyst solution. In addition, it is also possible to place more than one impeller in one of the reaction zones. As noted above, baffled-physical separation of the reaction zones also may be omitted, if desired.

The removal of hydrogen sulfide by the process of the present invention is carried out in an enclosed gas-liquid contact zone in which is located an aqueous medium containing transition metal chelate catalyst. A hydrogen sulfide-containing gas stream and an oxygen-containing gas stream, which usually is air but may be oxygen or oxygen-enriched air, are caused to flow along a vertical flow path from outside the gas-liquid contact zone to separate submerged locations in the aqueous catalyst medium from which the gas streams are forced by a rotating impeller in each reaction zone to flow through openings in a shroud surrounding the impeller into the body of the aqueous medium. Each impeller comprises a plurality of outwardly-extending blades and is rotated about a generally vertical axis. The rotating impeller also draws the liquid phase to the locations of introduction of the gas streams from the body of aqueous medium in the enclosed zone. When a vertical baffle is employed, a standpipe may pass upwardly to the impeller and a guide pipe may extend from the baffle to the respective impeller to assist in aqueous medium being drawn from one reaction zone to the impeller in the other to enhance the respective reactions thereat.

The gas-induction impeller and accompanying shroud may be constructed in the manner conventionally employed in an agitated flotation cell, as described in the aforementioned Canadian Patent No. 1,212,819. Alternatively, and preferably, the combination may be provided in the manner described in copending U.S. patent application Ser. No. 622,485 filed Dec. 5, 1990 now U.S. Pat. No. 5,174,973 (continuation-in-part of U.S. patent application Ser. No. 582,423 filed Sep. 14, 1990, itself a continuation-in-part of U.S. patent application Ser. No. 446,776 filed Dec. 6, 1989 now abandoned), in which one of us (James W. Smith) is named as an inventor, the disclosures of which are incorporated herein by reference. A variety of relative parameters and structural modifications are described in these latter patent applications, which also apply to the illustrated embodiments of apparatus described herein below, and are expressly incorporated herein by reference.

As noted earlier, the impeller-shroud combination is one embodiment of gas-liquid contact means which may be employed to achieve distribution of the gases as fine bubbles in the reaction medium.

If desired, circulation of aqueous medium within individual reaction zones or within the enclosed vessel may be effected by the employment of suitable pumping mechanisms.

The distribution of the gases as fine bubbles in the reaction medium in the region of the impellers enables a high rate of mass transfer to occur. In the body of catalyst solution, a complicated series of chemical reactions occurs resulting in an overall reaction which is represented by the equation:

$$H_2S + \tfrac{1}{2}O_2 \rightarrow S + H_2O$$

This overall reaction results in depletion of hydrogen sulfide from the hydrogen sulfide-containing gas stream to effect substantial removal therefrom and depletion of oxygen from the oxygen-containing gas stream.

The solid sulfur particles grow in size until of a size which can be floated. Alternative procedures of increasing the particle size may be employed, including spherical agglomeration or flocculation. The flotable sulfur particles are floated by the oxygen-depleted gas bubbles rising through the body of catalyst solution and collected as a froth on the surface of the aqueous medium. The sulfur particles range in size from about 10 to about 50 microns in diameter and are in crystalline form.

The hydrogen sulfide-depleted gas stream is removed from a gas space above the liquid level in the reaction zone to which the hydrogen sulfide-containing gas stream is fed. Since this gas space is physically separated from a similar gas space above the liquid level in the reaction zone to which the oxygen-containing gas stream is fed when the baffle is employed, the product gas stream is uncontaminated by oxygen.

The series of reactions which is considered to occur in the body of the metal chelate solution to achieve the overall reaction noted above is as follows:

$$H_2S = H^+ + HS^-$$

$$OH^- + FeEDTA^- = [Fe.OH.EDTA]^=$$

$$HS^- + [Fe.OH.EDTA]^= = [Fe.HS.EDTA]^= + OH^-$$

$$[Fe.HS.EDTA]^= = FeEDTA^- + S + H^+ + 2e$$

$$2e + \tfrac{1}{2}O_2 + H_2O = 2OH^-$$

$$2OH^- + 2H^+ = 2H_2O$$

As may be seen from these equations, the stoichiometric use of oxygen for the oxidation of hydrogen sulfide to sulfur requires one-half mole of oxygen for each mole of hydrogen sulfide. As noted earlier, most prior art hydrogen sulfide-removal procedures involving oxidation of hydrogen sulfide employ large excesses of oxygen with respect to stoichiometric. By the present invention, the oxygen requirement has been considerably decreased while obtaining highly-efficient removal of hydrogen sulfide from a variety of gas streams and, at the same time, providing the ability to avoid contamination of the product gas stream with oxygen. In experimentation, it has been found possible to decrease oxygen usage to below two times stoichiometric, generally to approximately 50% greater than stoichiometric.

Another embodiment of the invention is directed towards removing sulfur dioxide from gas streams. The procedure for such removal shows many similarities with the hydrogen sulfide-removal procedure just described, except that the aqueous medium in this case contains an alkaline material.

The aqueous alkaline medium into which the sulfur dioxide-containing gas stream is introduced may be provided by any convenient alkaline material in aqueous dissolution or suspension. One convenient alkaline material which can be used is an alkali metal hydroxide, usually sodium hydroxide. Another convenient material is an alkaline earth metal hydroxide, usually a lime slurry or a limestone slurry.

Absorption of sulfur dioxide in an aqueous alkaline medium tends to produce the corresponding sulfite. It is preferred, however, that the reaction product be the corresponding sulfate, in view of the greater economic attraction of the sulfate salts. For example, where lime or limestone slurry is used, the by-product is calcium sulfate (gypsum), a multi-use chemical.

Accordingly, in a preferred aspect of the invention, an oxygen-containing gas stream, which usually is air but which may be pure oxygen or oxygen-enriched air, analogously to the case of hydrogen sulfide, is separately introduced to the aqueous alkaline reaction medium at a submerged location physically separate from that at which the $SO_2$-containing gas stream is introduced, so as to cause the sulfate salt to be formed. When such oxidation reaction is effected in the presence of a lime or limestone slurry, it is generally preferred to add a small amount of an anti-caking agent, to prevent caking of the by-product calcium sulfate on the lime or limestone particles, decreasing their effectiveness. One suitable anti-caking agent is magnesium sulfate.

The concentration of sulfate salt builds up in the aqueous solution after initial start up until it saturates the solution, whereupon the sulfate commences to precipitate from the solution. The crystalline sulfate, usually sodium sulfate or calcium sulfate crystals, may be floated from the solution by the oxygen-depleted gas bubbles, if desired, with the aid of flotation-enhancing chemicals, if required.

DESCRIPTION OF PREFERRED EMBODIMENT

Referring to the drawings, there is illustrated in FIG. 1 an enclosed apparatus 10 for effecting removal of hydrogen sulfide from a hydrogen sulfide-containing gas stream in accordance with one preferred embodiment of the invention. The apparatus 10 contains a body of aqueous iron chelate solution 12, or other convenient transition metal chelate solution, and an internal baffle 14 extending downwardly into the aqueous iron chelate solution 12 from an upper closure 15 towards but spaced from a lower closure 16, dividing the vessel 10 into two reaction zones 8 and 9.

A gas feed pipe 17, 18 extends downwardly into the apparatus 10 on each side of the baffle 14 into the respective reaction zones 8 and 9. An impeller 20, 22 is provided adjacent the lower end of the gas feed pipe 17, 18 respectively and is mounted for rotation about an axle 24, 26, so as to induce gas flow into and through the pipes 17, 18. If desired, a fan or blower may be used to increase the gas flow rate to one or both of the impellers 20, 22. Each impeller 20, 22 comprises a plurality of radially-extending blades. In the case of pipe 17, a hydrogen sulfide-containing gas stream 28, such as, a sour natural gas stream, is induced and, in the case of pipe 18, an oxygen-containing gas stream 30, such as air, oxygen or oxygen-enriched air, is induced.

Surrounding each impeller 20, 22 is a cylindrical stationary shroud 32, 34, which has a plurality of openings 36 therethrough, which, combined with the rotation of the impeller 20, 22, results in dispersion of the gases fed through the respective pipes 17 and 18 in the form of fine bubbles. Dispersion of the fine bubbles of hydrogen sulfide-containing gas stream in the iron chelate solution promotes gas-liquid contact and rapid reaction of the hydrogen sulfide to sulfur in the iron chelate solution. Although, in the illustrated embodiment, the shrouds 32 and 34 are right cylindrical and stationary, it is possible for one or both of the shrouds 32 and 34 to possess other shapes. For example, the shrouds 32, 34 may be tapered, with each impeller 20, 22 optionally being tapered. In addition, one or both of the shrouds 32, 34 may be rotated, if desired, usually in the opposite direction to the respective impeller 20, 22.

Dispersion of the fine bubbles of oxygen-containing gas stream in the iron chelate solution promotes gas-liquid contact and rapid regeneration of the iron chelate solution. The various reactions which occur in the body of iron chelate solution 12 are described above and result in an overall reaction in the reactor 10 represented by the equation:

$$H_2S + \tfrac{1}{2}O_2 \rightarrow S + H_2O$$

The hydrogen sulfide is removed from the hydrogen sulfide-containing gas stream in contact with the iron chelate solution and bubbles of hydrogen sulfide-depleted gas rise in the reaction zone 8 towards the surface of the iron chelate solution in that zone. Similarly, oxygen is removed from the oxygen-containing gas stream in contact with the iron chelate solution and bubbles of oxygen-depleted gas rise in the reaction zone 9 towards the surface of the iron chelate solution in that zone.

The fine sulfur particles which are formed grow in the body of the iron chelate solution until they reach a size which permits them to be floated to the surface of the iron chelate solution in the respective reaction zones 8 and 9 by the respective bubbles of depleted gas stream, to form a sulfur froth 38 on the iron chelate solution surface. The sulfur is obtained in orthorhombic crystalline form with a particle size ranging from about 10 to about 30 microns. This narrow particle size range permits ready separation of the sulfur from entrained iron chelate solution in further processing of the froth 38. The sulfur may be removed from the surface of the iron chelate solution in each of the zones 8 and 9 by respective skimmers 40, 42 into launders 44, 46.

The hydrogen sulfide-depleted gas stream is collected in a gas space 48 above the surface of the iron chelate solution in zone 8 and is removed by line 50.

The oxygen-depleted gas stream is collected in the gas space 52 above the surface of the iron chelate solution in zone 9 and is removed by line 54. The presence of the baffle 14 ensures that the gas spaces 48 and 52 are physically separated one from another, so that the respective depleted gas streams cannot mix.

Similarly, the presence of the baffle 14 extending downwardly into the body 12 of iron chelate prevents the oxygen-containing gas stream fed to the reaction zone 9 from entering the reaction zone 8, so that contamination of the product gas stream in line 50 by oxygen is avoided.

In the illustrated embodiment, the impeller and shroud combination 22 and 34 for the oxygen-containing gas stream is smaller than the impeller and shroud combination 20 and 32 for the hydrogen sulfide-containing gas stream. This arrangement is the usual one, since the concentration of hydrogen sulfide in the gas stream being treated is usually very much less than the concentration of oxygen in the oxygen-containing gas stream. However, the impeller-shroud combinations may have the same or larger size, as desired.

Figure 2:
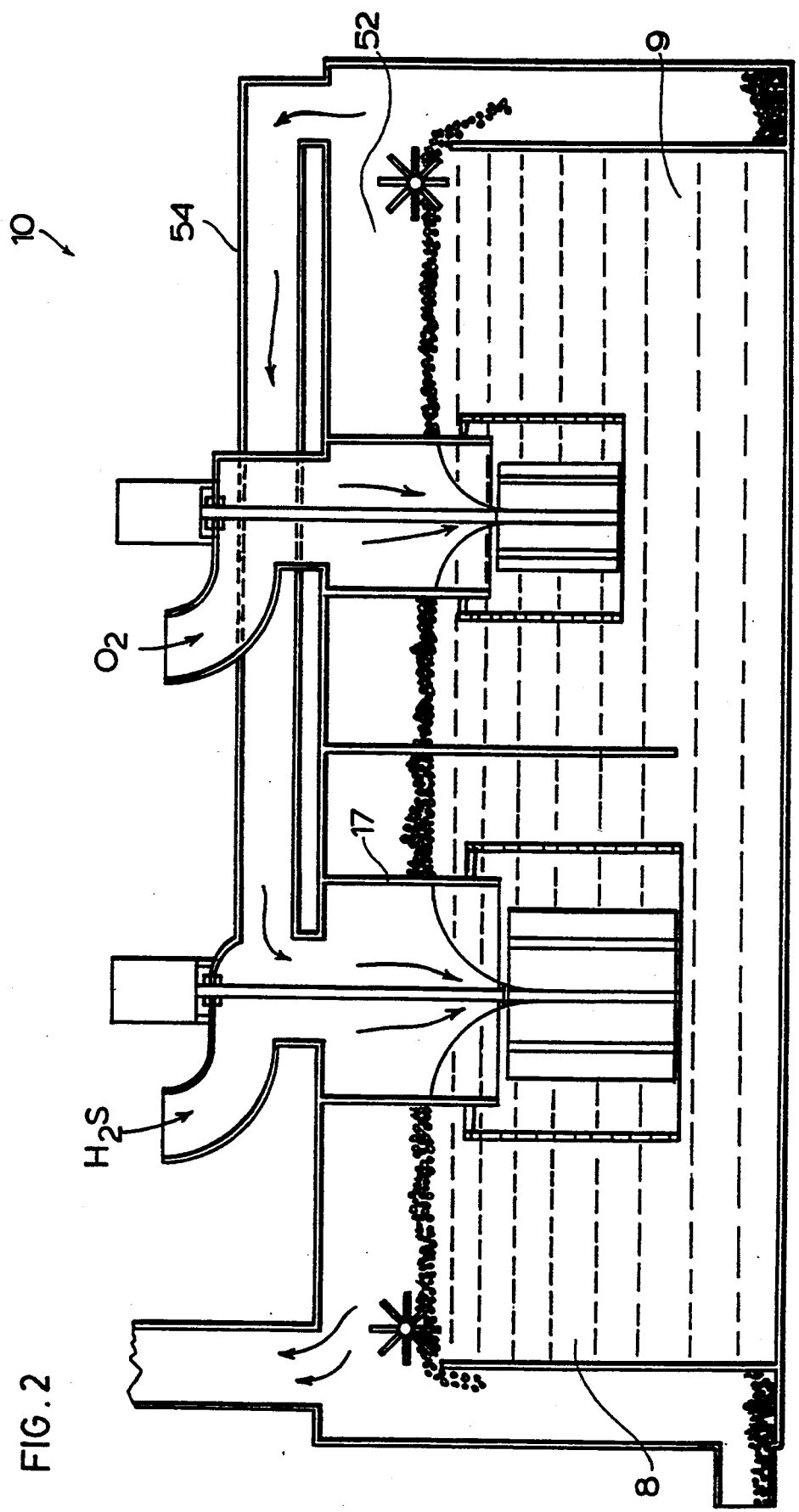
FIG. 2 is a schematic representation of an apparatus constructed with another embodiment of the invention.

FIG. 2 differs from FIG. 1 in that the outlet 54 for oxygen-depleted gas stream is fed to the inlet pipe 17 for the hydrogen sulfide-containing gas stream. As a result, oxygen present in the oxygen-depleted gas stream is distributed along with the hydrogen sulfide in reaction zone 8 and is rapidly consumed therein, thereby further decreasing the overall oxygen requirement to close to stoichiometric. This arrangement is also beneficial where some hydrogen sulfide-depleted gas bubbles have entered zone 9 and hence are collected along with the oxygen-depleted gas in the gas space 52.

By providing separate feeds of hydrogen sulfide-containing gas stream and oxygen-containing gas stream into two separate reaction zones within the same body of iron chelate catalyst solution, in contrast to the arrangement described in Canadian Patent No. 1,212,819, where both gas streams are fed to the same submerged location in the iron chelate solution, a considerably-improved process efficiency, in terms of oxygen usage, is obtainable. As mentioned above, the best result obtainable with the prior system required five times stoichiometric use of oxygen, whereas by using the arrangement illustrated in FIG. 1 of the drawings, less than twice the stoichiometric amount of oxygen is required.

One particular advantage that the present invention provides is with respect to the processing of natural gas and similar flammable gas feeds. Since the oxygen-containing gas stream does not come into contact with the hydrogen-sulfide gas stream during the hydrogen sulfide removal operation, potentially explosive gas mixtures are not formed. In addition, if further processing of the gas stream is required, the volume of gas to be handled has not been increased.

In addition, since the gases are separately fed to separate submerged locations, there is no mutual dilution of the hydrogen sulfide and oxygen in the respective gas streams fed to the reactor 10, so that there is achieved a much higher mass transfer rate at each impeller 20, 22 than is achieved in Canadian Patent No. 1,212,819. In the latter patent, the gas streams both are fed to the same submerged location, either as a mixture of gases or separately, so that the gases mutually dilute each other at the submerged locations. As a result of the higher mass transfer rate achieved herein, higher concentrations of hydrogen sulfide can be treated in the same size of equipment.

In addition to the above-noted advantages, the present invention also shares the advantages of the system described in Canadian Patent No. 1,212,819, namely that hydrogen sulfide is rapidly and efficiently removed from gas streams containing the same, the by-product sulfur is obtained in a narrow particle size range, and induction of the gases is effected at low pressure drop, thereby decreasing the need for pumping.

As mentioned above, the present invention is not limited to the treatment of hydrogen sulfide-containing gas streams to remove the hydrogen sulfide therefrom but is broadly directed to any process in which a gaseous component is reacted to an insoluble phase in a liquid medium, often in a form which then can be floated from the solution. Alternatively, other removal methods, such as filtration, may be employed.

For example, the apparatus 10 illustrated in FIGS. 1 and 2 may be employed to effect the removal of mercaptans from a gas stream containing the same, which is fed by line 28. In this process, the metal chelate solution 12 is replaced by an aqueous sodium hydroxide solution and the liquid disulfides which result from the oxidation are floated off and removed from the surface of the sodium hydroxide solution.

Gas streams contaminated with hydrogen sulfide often also are contaminated by mercaptans, such as sour natural gas streams. In accordance with one embodiment of the invention, both components may be removed from a gas stream containing them by a sequential operation in which the hydrogen sulfide or mercaptans first is removed from the gas stream in a first reactor 10 and the other gas subsequently is removed from the gas stream by feeding the product gas stream from the first reactor 10 to a second reactor 10.

EXAMPLE

An experimental apparatus was constructed in accordance with FIG. 1 and experiments were conducted in the apparatus to determine the minimum amount of oxygen required by the two-impeller system, with a hydrogen sulfide-containing gas stream being fed to one impeller and with oxygen only being fed to the other impeller.

On the $H_2S$-impeller side, known volumes of hydrogen sulfide were introduced into a nitrogen-bearing gas stream while in the second chamber, a known amount of oxygen was introduced. Above the liquid level, a gas tight barrier was provided while below the liquid level, a fine mesh was provided which allowed a portion of the liquid to pass through while excluding all but the finest of bubbles.

Initially the system was caused to sulfide by flowing excess amounts of hydrogen sulfide and no oxygen into the reactor, which contained a body of iron chelate solution. Sulfiding was characterized by the formation of a black-olive solution, as opposed to the normal pale brown coloration, and very poor $H_2S$ removal.

The oxygen flow rate was slowly increased and the $H_2S$ outlet concentration measured continuously. A point was reached where the removal rate of hydrogen sulfide started to increase, as hydrogen sulfide outlet concentration fell; which was the point where there was just enough oxygen to regenerate sufficient catalyst to replace that sulfide by the $H_2S$. The value then was the minimum oxygen requirement to maintain the reactor system. The procedure was performed at different gas flow rates and rpm.

The results obtained are tabulated in Tables I, II and III below:

TABLE I

| Operating Conditions | |
|---|---|
| Inlet hydrogen sulfide concentration | 1000 ppm |
| sodium ion concentration | 0.02 molar |
| Iron concentration | 1 g/L |
| Operating pH range | 9.0 to 9.2 |

TABLE II

| | Oxygen Flow Rate (mL/min) | | | |
|---|---|---|---|---|
| | Nitrogen Flow Rate (L/min) | | | |
| RPM | 10 | 20 | 30 | 50 |
| 600 | 15.4 | 42.7 | 73.5 | |
| 900 | 8.08 | 31.9 | | |
| 1200 | 7.64 | 21.1 | 55.1 | 125 |
| 1500 | | 16.4 | 42.1 | |
| 1800 | 7.02 | 15.4 | 38.5 | 106 |

TABLE III

| | Mol Ratio of Oxygen to $H_2S$ | | | |
|---|---|---|---|---|
| | Nitrogen Flow Rate (L/min) | | | |
| RPM | 10 | 20 | 30 | 50 |
| 600 | 1.5 | 2.1 | 2.4 | |
| 900 | 0.81 | 1.9 | | |
| 1200 | 0.76 | 1.1 | 1.8 | 2.5 |
| 1500 | | 0.82 | 1.4 | |
| 1800 | 0.70 | 0.77 | 1.3 | 2.1 |

Table III shows the mole ratio of oxygen required to $H_2S$ consumed. Theoretically, 0.5 mol of $O_2$ is required per mol of $H_2S$. The minimum oxygen required is 1.4 times stoichiometric, as shown in Table III at 10 L/min $N_2$ and 1800 rpm.

SUMMARY OF DISCLOSURE

In summary of this disclosure, the present invention provides a novel method and apparatus for the efficient removal of gaseous components from gas streams, employing a dual-impeller arrangement for the separate distribution of a gaseous component-containing gas stream and a second gas stream as fine bubbles in a suitable liquid medium for formation of an insoluble phase, which can be collected by flotation, if desired. Modifications are possible within the scope of this invention.

What we claim is:

1. A method for the removal of a gaseous component from a gas stream containing the same by chemical conversion to an insoluble phase in a liquid medium, which comprises:

providing an enclosed reaction zone having said single body of liquid medium therein in which said gaseous component is capable of being absorbed, said reaction zone having a baffle extending from a top closure to said reaction zone downwardly into said liquid medium to an extent sufficient, during operation of the method, to prevent undissolved gases from migrating from one side of said baffle to the other side of said baffle while providing an opening permitting substantially unconstrained liquid flow between the sides of the baffle below a lower extremity of the baffle.

forming a first continuously circulating flow pattern of liquid medium within a first submerged location of said one side of said baffle by a first mechanically-driving gas-liquid contact mechanism, feeding said gaseous component-containing gas stream to said first continuously circulating flow pattern at said first submerged location in said single body of liquid medium to establish an individual absorption zone within said single body of liquid medium and distributing said gas stream at said first submerged location in the form of small gas bubbles by said first mechanically-driven gas-liquid contact mechanism, forming a second continuously circulating flow pattern of liquid medium within a second submerged location on said other side of said baffle by a second mechanically-driven gas-liquid contact mechanism.

feeding a second gas stream different from said gaseous component-containing gas stream and capable of being absorbed by and reacting with said liquid medium having gaseous component absorbed therein to form said insoluble phase, to said second continuously circulating flow pattern at said second submerged location in said single body of liquid medium spaced apart from said first submerged location in the form of small gas bubbles by said second mechanically-driven gas-liquid contact mechanism while said baffle maintains gas in said second continuously circulating flow pattern in non-mixing relationship with gas in said first continuously circulating flow pattern, said first and second continuous flow patterns of liquid medium interacting with each other to establish a further continuous flow pattern of liquid medium through said opening permitting substantially unconstrained liquid flow between the sides of the baffle, whereby the action of said first and second mechanically-driven gas-liquid contact mechanisms continuously facilitate and promote interaction between said absorbed gaseous component, said second gas stream and said liquid medium in a region of said single body of liquid medium below said submerged locations and the lower extremity of the baffle to effect conversion of said gaseous component to said insoluble phase in said single body of liquid medium.

2. The method of claim 1 wherein said insoluble phase is flotable by said gas bubbles when depleted of reacted gaseous components thereof, and said depleted gas bubbles are permitted to rise through the liquid medium on the respective sides of the baffle and to float said insoluble phase on the surface of liquid medium on the respective sides of the baffle, and wherein said depleted gas bubbles, after reaching the surface of the liquid medium on the respective sides of the baffle, form a gaseous component-depleted atmosphere above said liquid medium on said one side of the baffle and a second atmosphere above said liquid medium of said other side of said baffle and physically separated from said gaseous component-depleted atmosphere by said baffle.

3. The method of claim 1 wherein said second gas stream is an oxidative component-containing gas stream and said liquid medium is an aqueous medium containing a catalyst for oxidative conversion of said gaseous component to said insoluble phase.

4. The method of claim 3 wherein a gaseous component-depleted stream is vented from said gaseous component-depleted atmosphere and another gas stream is vented from said second atmosphere.

5. The method of claim 1 wherein said first and second mechanically-driven gas-liquid contact means each comprises a rotary impeller and a shroud surrounding the impeller and having a plurality of openings therethrough.

6. The method of claim 5 wherein said rotary impeller and stationary shroud are located at the lower end of a gas feed pipe extending from said upper closure to said reaction vessel and said respective feeds of said gaseous component-containing stream and said second gas stream to said first and second continuously circulating flow pattern of liquid medium are induced through the gas feed pipe by rotation of the respective rotary impeller.

7. The method of claim 1 wherein said gas stream is a hydrogen sulfide-containing gas stream from which hydrogen sulfide is to be removed as the removed gaseous component, said second gas stream is an oxygen-containing gas stream, said liquid medium is an aqueous transition metal chelate solution, and said insoluble phase is solid sulfur-containing particles.

8. The method of claim 7 wherein said sulfur particles are floated from the transition metal chelate solution in the individual reaction zones by the bubbles of the depleted gas streams and are recovered in the form of a froth containing sulfur having a particle size from about 10 to about 30 microns.

9. The method of claim 8 wherein said sulfur-bearing froth is removed from the surface of the transition metal chelate solution in both reaction zones.

10. The method of claim 8 wherein said transition metal chelate solution is an iron chelate solution having a pH of about 7 to about 11 and a temperature of about 5° to about 80° C.

11. The method of claim 7 wherein said gas stream is a sour natural gas stream.

12. The method of claim 1 wherein said gas stream is a hydrogen sulfide-containing gas stream from which hydrogen sulfide is to be removed as the removed gaseous component, said second gas stream is a chlorine-containing gas stream, said liquid medium is an aqueous sodium hydroxide solution, and said insoluble phase is sodium sulphate crystals formed after saturation of the aqueous solution after start-up.

13. The method of claim 1 wherein said gas stream is a mercaptan-containing gas stream from which mercaptans are to be removed as the removed gaseous component, the second gas stream is an oxygen-containing gas stream, and the insoluble phase is immiscible liquid disulfides.

14. The method of claim 1 wherein said gaseous component-containing gas stream contains both mercaptans and hydrogen sulfide and said mercaptans and hydrogen sulfide are removed from said gas stream in successive operations of the method of claim 1 in separate reaction vessels.

15. The method of claim 1 wherein said gas stream is a sulfur dioxide-containing gas stream from which sulfur dioxide is to be removed as the removed gaseous component, said second gas stream is a hydrogen sulfide-containing gas stream, said liquid medium is an aqueous absorbent medium for sulfur dioxide, and said insoluble phase is solid sulfur-containing particles.

16. The method of claim 1 wherein said gas stream is a sulfur dioxide-containing gas stream from which sulfur dioxide is to be removed as the removed gaseous component, in said second gas stream is an oxygen-containing gas stream, said chemical conversion agent is an alkaline material capable of reacting with sulfur dioxide, said liquid medium is an aqueous medium containing said alkaline material, and said insoluble phase comprises the reaction product of said sulfur dioxide, oxygen in said oxygen-containing gas stream and said alkaline material.

17. The method of claim 16 wherein said aqueous medium comprises a lime or limestone slurry.

18. The method of claim 16 wherein said slurry has a concentration of about 1 to about 20 wt % of alkaline material.

19. The method of claim 16 wherein said aqueous medium also contains an effective amount of magnesium sulfate.

20. The method of claim 16 wherein said aqueous medium comprises an aqueous solution of an alkali metal hydroxide.

21. The method of claim 20 wherein said alkali metal hydroxide has a concentration of about 50 to about 500 g/L in said aqueous medium.

22. A method of the removal of a gaseous component from a gas stream containing the same by chemical conversion to an insoluble phase in a liquid medium, which comprises:

providing an enclosed reaction zone having said single body of liquid medium therein in which said gaseous component is capable of being absorbed, said reaction zone having a baffle extending from a top closure to said reaction zone downwardly into said liquid medium to an extent sufficient, during operation of the method, to prevent undissolved gases from magrating from one side of said baffle to the other side of said baffle while providing an opening permitting substantially unconstrained liquid flow between the sides of the baffle below a lower extremity of the baffle, forming a first continuously circulating flow pattern of liquid medium within a first submerged location on said one side of said baffle by a first mechanically-driven gas-liquid contact mechanism, feeding said gaseous component-containing gas stream to said first continuously circulating flow pattern at said first submerged location in said single body of liquid medium to establish an individual absorption zone within said single body of liquid medium and distributing said gas stream at said first submerged location in the form of small gas bubbles by said first mechanically-driven gas-liquid contact mechanism, forming a second continuously circulating flow pattern of liquid medium within a second submerged location on said other side of said baffle by a second mechanically-driven gas-liquid contact mechanism, feeding a second gas stream different from said gaseous component-containing gas stream and capable of being absorbed by and reacting with said liquid medium having gaseous component absorbed therein to form said insoluble phase, to said second continuously circulating flow pattern at said second submerged location in said single body of liquid medium spaced apart from said first submerged location in the form of small gas bubbles by said second mechanically-driven gas-liquid contact mechanism while said baffle maintains gas in said second continuously circulating flow pattern in non-mixing relationship with gas in said first continuously circulating flow pattern, said first and second continuous flow patterns of liquid medium interacting with each other to establish a further continuous flow pattern of liquid medium through said opening permitting substantially unconstrained liquid flow between the sides of the baffle, whereby the action of said first and second mechanically-driven gas-liquid contact mechanisms continuously facilitate and promote interaction between said absorbed gaseous component, said second gas stream and said liquid medium in a region of said single body of liquid medium below said submerged locations and the lower extremity of the baffle to effect conversion of said gaseous component to said insoluble phase in said single body of liquid medium, said second gas stream being an oxidative component-containing gas stream and said liquid medium being an aqueous medium containing a catalyst for oxidative conversion of said gaseous component to said insoluble phase, forming a gaseous component-depleted atmosphere above said liquid medium on said one side of the baffle from bubbles of gas reaching the surface of the liquid medium on said one side of the baffle, forming an oxidative component-depleted atmosphere above said liquid medium on said other side of said baffle and physically separated from the gaseous component-depleted atmosphere by said baffle from bubbles of gas reaching the surface of the liquid medium on the other side of the baffle, venting a gaseous component-depleted stream from said gaseous component-depleted atmosphere, and feeding an oxidative component-depleted gas stream from said gaseous component-containing atmosphere to said gaseous component-containing feed stream.

* * * * *